United States Patent
Aoki et al.

(10) Patent No.: US 8,148,456 B2
(45) Date of Patent: Apr. 3, 2012

(54) CONDUCTIVE RESIN COMPOSITION AND CONDUCTIVE SHEETS COMPRISING THE SAME

(75) Inventors: Yutaka Aoki, Isezaki (JP); Takeshi Miyakawa, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 674 days.

(21) Appl. No.: 12/304,785

(22) PCT Filed: Aug. 10, 2007

(86) PCT No.: PCT/JP2007/065776
§ 371 (c)(1),
(2), (4) Date: Dec. 15, 2008

(87) PCT Pub. No.: WO2008/020579
PCT Pub. Date: Feb. 21, 2008

(65) Prior Publication Data
US 2009/0280280 A1    Nov. 12, 2009

(30) Foreign Application Priority Data

Aug. 15, 2006 (JP) .................................. 2006-221351
Sep. 6, 2006 (JP) .................................. 2006-240933
Oct. 30, 2006 (JP) .................................. 2006-293450
Oct. 30, 2006 (JP) .................................. 2006-294947

(51) Int. Cl.
*C08K 3/04* (2006.01)

(52) U.S. Cl. .................................. 524/495; 428/35.2
(58) Field of Classification Search .................. 428/35.2; 524/495
See application file for complete search history.

(56) References Cited

U.S. PATENT DOCUMENTS 5,360,658 A    11/1994    Schmitz et al.

FOREIGN PATENT DOCUMENTS

| JP | 57-205145   | 12/1982  |
|----|-------------|----------|
| JP | 62-18261    | 1/1987   |
| JP | 2 199143    | 8/1990   |
| JP | 5 311061    | 11/1993  |
| JP | 6 41414     | 2/1994   |
| JP | 6 166809    | 6/1994   |
| JP | 6 179806    | 6/1994   |
| JP | 6 184332    | 7/1994   |
| JP | 9-76424     | 3/1997   |
| JP | 9-76425     | 3/1997   |
| JP | 11 42739    | 2/1999   |
| JP | 2002-67258  | 3/2002   |
| JP | 2003-512207 | 4/2003   |
| JP | 2003 292760 | 10/2003  |
| JP | 2004 87370  | 3/2004   |
| JP | 2004 91691  | 3/2004   |
| JP | 2004 203993 | 7/2004   |
| JP | 2004 204006 | 7/2004   |
| JP | 2005 157073 | 6/2005   |
| JP | 2005 297504 | 10/2005  |
| JP | 2006 160834 | 6/2006   |

*Primary Examiner* — Edward Cain
(74) *Attorney, Agent, or Firm* — Oblon, Spivak, McClelland, Maier & Neustadt, L.L.P.

(57) ABSTRACT

To provide an electrically conductive resin composition with which contamination of an electronic component resulting from abrasion of an electrically conductive sheet by friction with the electronic component is small, and which is excellent in sealing properties with a cover tape.

An electrically conductive resin composition comprising 100 parts by mass of a thermoplastic resin containing from 60 to 97 mass % of a polycarbonate resin and from 3 to 40 mass % of at least one hydrocarbon copolymer selected from the group consisting of an olefin copolymer and a styrene copolymer, and from 5 to 50 parts by mass of carbon black, and an electrically conductive sheet comprising the electrically conductive resin composition. Further, an electrically conductive sheet, comprising a substrate layer containing at least one thermoplastic resin selected from the group consisting of an acrylonitrile/butadiene/styrene copolymer (ABS) resin, a polycarbonate resin and a polyalkylene terephthalate resin, and a layer of the above electrically conductive resin composition formed on one side or both sides of the substrate layer.

22 Claims, No Drawings

US 8,148,456 B2

CONDUCTIVE RESIN COMPOSITION AND CONDUCTIVE SHEETS COMPRISING THE SAME

TECHNICAL FIELD

The present invention relates to an electrically conductive resin composition to be used for an electronic component package which has mechanical strength capable of coping with high speed packaging and mounting, and an electrically conductive sheet using it.

BACKGROUND ART

For packaging semiconductors such as IC and electronic components using IC, an injection tray, a vacuum-formed tray, a magazine, an embossed carrier tape, etc. are used. An embossed carrier tape is mainly used in view of efficient packaging and mounting of electronic components. For such a packaging container, one having an electrically conductive filler dispersed is used to prevent electronic components such as IC from being destroyed by static electricity. As the electrically conductive filler, carbon black is widely used to achieve a stable surface resistivity uniformly at a low cost.

An electrically conductive packaging container comprising a thermoplastic resin having carbon black dispersed has such a problem that mechanical strength and moldability tend to decrease by addition of carbon black. Further, by friction between an electronic component as a content and the packaging container, the surface of the packaging container may be abraded, whereby the resin containing carbon black on the surface is separated to contaminate the electronic component. As a method of solving the former problem, it is proposed to employ a multilayer structure and to add carbon black to the surface layer (for example, Patent Documents 1 and 2). As a method of solving the latter problem of separation of carbon, it is proposed to add an olefin resin or a styrene thermoplastic elastomer to the surface layer containing carbon black (for example, Patent Documents 3 and 4). However, miniaturization and high integration of electronic components are in rapid progress, and as a packaging container for such electronic components, a packaging container such as an embossed carrier tape, which has higher mechanical strength, which is less likely to cause contamination and which is further excellent in dimensional stability, has been desired.

As a method to achieve such an object, for example, Patent Document 5 proposes a sheet comprising, as a substrate layer, an acrylonitrile/butadiene/styrene copolymer resin and/or a polystyrene resin, and as a surface layer thereof, a polycarbonate resin composition containing carbon black laminated on the substrate layer, and a packaging container using the sheet, such as a carrier tape. Further, Patent Document 6 proposes a sheet comprising, as a substrate layer, a polycarbonate resin, and as a surface layer thereof, a polycarbonate resin composition containing carbon black laminated on the substrate layer, and a packaging container using the sheet, such as a carrier tape. However, an embossed carrier tape comprising an electrically conductive sheet using a polycarbonate resin for the surface layer has low sealing properties with a cover tape to be used as a covering material when an electronic component is packaged, and so as to obtain sufficient sealing strength, the sealing time should be prolonged, or the sealing temperature should be increased, and such is difficult to cope with high speed packaging.

Patent Document 1: JP-A-57-205145
Patent Document 2: JP-A-62-18261
Patent Document 3: JP-A-9-76424
Patent Document 4: JP-A-9-76425
Patent Document 5: JP-A-2003-512207
Patent Document 6: JP-A-2002-67258

DISCLOSURE OF THE INVENTION

Object to be Accomplished by the Invention

The present invention is to provide an electrically conductive resin composition which is less likely to contaminate electronic components by abrasion of an electrically conductive sheet by friction with the electronic components, which has mechanical strength capable of coping with high speed packaging and mounting, and which is excellent in sealing properties with a cover tape, and an electrically conductive sheet using it.

Means to Accomplish the Object

To achieve the above object, the present invention provides the following.

(1) An electrically conductive resin composition comprising 100 parts by mass of a thermoplastic resin containing from 60 to 97 mass % of a polycarbonate resin and from 3 to 40 mass % of at least one hydrocarbon copolymer selected from the group consisting of an olefin copolymer and a styrene copolymer, and from 5 to 50 parts is by mass of carbon black.

(2) An electrically conductive resin composition comprising 100 parts by mass of a thermoplastic resin containing from 33 to 93 mass % of a polycarbonate resin, from 3 to 44 mass % of a polyalkylene terephthalate resin and from 3 to 40 mass % of at least one hydrocarbon copolymer selected from the group consisting of an olefin copolymer and a styrene copolymer, and from 5 to 50 parts by mass of carbon black.

(3) An electrically conductive sheet comprising the electrically conductive resin composition as defined in the above (1) or (2).

(4) An electrically conductive sheet, comprising a substrate layer containing at least one thermoplastic resin selected from the group consisting of an acrylonitrile/butadiene/styrene copolymer (ABS) resin, a polycarbonate resin and a polyalkylene terephthalate resin, and a layer of the electrically conductive resin composition as defined in the above (1) or (2) formed on one side or both sides of the substrate layer.

(5) The electrically conductive sheet according to the above (3) or (4), which has a surface resistivity of from $10^2$ to $10^{10} \Omega$.

(6) A container for packaging an electronic component, using the electrically conductive sheet as defined in any one of the above (3) to (5).

(7) An embossed carrier tape using the electrically conductive sheet as defined in any one of the above (3) to (5).

(8) An electronic component package using the embossed carrier tape as defined in the above (7).

Effects of the Invention

The electrically conductive sheet comprising the electrically conductive resin composition of the present invention has good sealing properties with a cover tape and is thereby suitable for high speed packaging and high speed mounting, and further, a molded product to be obtained is less likely to contaminate an electronic component which is a content therein by friction with the electronic component and is thereby suitable for an electronic component package such as an embossed carrier tape with high precision.

BEST MODE FOR CARRYING OUT THE INVENTION

The polycarbonate resin in the electronically conductive resin composition is one derived from a dihydroxy compound, preferably an aromatic dihydroxy compound, particularly preferably an aromatic dihydroxy compound (bisphenol) having two aromatic dihydroxy compounds bonded via a certain connecting group. The polycarbonate resin may be one produced by a known method and its production method is not limited, and a commercially available resin may be used.

The olefin copolymer in the electrically conductive resin composition is a copolymer containing ethylene or propylene as the main component, or a blend thereof. Preferred is a copolymer containing ethylene as the main component, and in the present invention, particularly preferred is an ethylene/vinyl acetate copolymer (EVA) or an ethylene/ethyl acrylate copolymer (EEA). Further, one obtained by graft polymerization of polar groups such as maleic anhydride to such a copolymer may also be suitably used.

In the present invention, the styrene copolymer is preferably a styrene/diene block copolymer resin, a resin having a styrene/diene block copolymer hydrogenated, a styrene/butadiene/butyrene/styrene block copolymer resin, or the like. In the styrene/diene block copolymer resin and the resin having a styrene/diene block copolymer hydrogenated, the diene is preferably butadiene or isoprene.

The styrene/butadiene/butyrene/butyrene block copolymer is a copolymer having the following chemical structures:

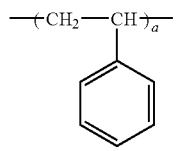

"a" is an integer of at least 1.

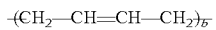

"b" is an integer of at least 1.

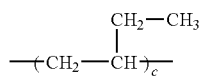

"c" is an integer of at least 1.
So long as it has the above structure, the method for its production is not particularly limited. For example, production methods are reported in "Structure and Performance of Novel Styrene Type Thermoplastic Elastomer (SBBS)" (Shuji Sakae et al, the 9th Polymer Material Forum, p. 125-126, 2000), JP-A-64-38402, JP-A-60-220147, JP-A-63-5402, JP-A-63-4841, JP-A-61-33132, JP-A-63-5401, JP-A-61-28507 and JP-A-61-57524. A commercial product of the styrene/butadiene/butylene/styrene block copolymer may be used as it is.

The polyalkylene terephthalate resin in the electrically conductive resin composition may be one obtained mainly from ethylene glycol or 1,4-butanediol as a glycol component and terephthalic acid or its dimethyl ether as a dicarboxylic acid component, and in addition, one having part of the copolymer monomer, i.e. the glycol component replaced with diethylene glycol, 1,4-tetramethylene glycol, 1,4-cyclohexane dimethanol or heptamethylene glycol, or the dicarboxylic acid component replaced with isophthalic acid, 1,5-naphthalene dicarboxylic acid or adipic acid, may be used. Preferred is a polyalkylene terephthalate resin having, as a glycol component, a 1,4-cyclohexane dimethanol component copolymerized in an amount of from 0.1 to 10 mol %, or a polyalkylene terephthalate resin having, as an acid component, an isophthalic acid component copolymerized in an amount of at least 1 mol % and at most 10 mol %, in view of moldability. It may, for example, be a polybutylene terephthalate resin (PET), a polybutylene terephthalate resin (PBT) or polytrimethylene terephthalate (PTT).

The electrically conductive resin composition of the present invention contains at least one hydrocarbon copolymer (hereinafter sometimes referred to simply as a hydrocarbon copolymer) selected from the group consisting of an olefin copolymer and a styrene copolymer, and when the hydrocarbon copolymer is an olefin copolymer, the content of an olefin (the content of olefin polymerized units, the same applies to the content of the following monomer) in the olefin copolymer is preferably from 20 to 48 mass %. Particularly when the olefin copolymer is an ethylene/vinyl acetate copolymer, the ethylene content is preferably from 25 to 48 mass %, more preferably from 30 to 48 mass %. Further, when the olefin copolymer is an ethylene/ethyl acrylate copolymer, the ethylene content is preferably from 20 to 40 mass %, more preferably from 30 to 40 mass %.

Further, when the hydrocarbon copolymer contained in the electrically conductive resin composition is a styrene copolymer, the styrene content in the styrene copolymer is preferably from 10 to 80 mass %, more preferably from 40 to 80 mass %.

The content ratio of the polycarbonate resin to the at least one hydrocarbon copolymer selected from the group consisting of an olefin copolymer and a styrene copolymer in the electrically conductive resin composition is such that in 100 mass % of the resin composition, the polycarbonate resin accounts for from 60 to 97 mass % and the hydrocarbon copolymer accounts for from 3 to 40 mass %, preferably the polycarbonate resin accounts for from 70 to 95 mass %, and the hydrocarbon copolymer accounts for from 5 to 30 mass %. If the polycarbonate resin is less than 60 mass %, mechanical properties of the sheet tend to decrease, and if it exceeds 97 mass %, the amount of heat at the time of forming tends to remarkably increase.

Further, if the content of the hydrocarbon copolymer is less than 3 mass %, no sufficient effect of improving the sealing strength tends to be obtained, and if exceeds 40 mass %, the mechanical properties of the sheet tend to decrease. The preferred range of the content ratio of the polycarbonate resin to the hydrocarbon copolymer in the electrically conductive resin composition is determined considering the balance of physical properties such as impact strength in addition to the sealing strength.

The content ratio of the polycarbonate resin to, the polyalkylene terephthalate resin, and the at least one hydrocarbon copolymer selected from the group consisting of an olefin copolymer and a styrene copolymer in the electrically conductive resin composition is such that in 100 mass % of the thermoplastic resin contained in the electrically conductive resin composition, the polycarbonate resin accounts for from 33 to 93 mass %, the polyalkylene terephthalate resin accounts for from 3 to 44 mass %, and the hydrocarbon copolymer accounts for from 3 to 40 mass %, preferably the polycarbonate resin accounts for from 46 to 85 mass %, the polyalkylene terephthalate resin accounts for from 10 to 44 mass %, and the hydrocarbon copolymer accounts for from 5 to 30 mass %.

If the content of the polycarbonate resin is less than 33 mass %, mechanical properties of the sheet tend to decrease, and if it exceeds 93 mass %, the amount of heat at the time of forming tends to remarkably increase. If the content of the polyalkylene terephthalate resin is less than 3 mass %, the amount of heat at the time of forming tends to remarkably increase, and if it exceeds 40 mass %, the melt viscosity at the time of sheet formation tends to be low, whereby the accuracy of thickness tends to decrease. If the content of the hydrocarbon copolymer is less than 3 mass %, no sufficient effect of improving the sealing strength tends to be obtained, and if it exceeds 40 mass %, the mechanical properties of the sheet to be obtained tend to decrease. Further, the preferred range of the content ratio of the polycarbonate resin, the polyalkylene terephthalate resin and the hydrocarbon copolymer in the electrically conductive resin composition is determined considering the balance of physical properties such as impact strength in addition to the sealing strength.

Carbon black to be used for the electrically conductive resin composition may, for example, be furnace black, channel black or acetylene black, and preferred is one having a large specific surface area and capable of providing high electrical conductivity with a small addition amount to the resin. For example, acetylene black or Ketjenblack is preferred.

The content of carbon black in the electrically conductive resin composition is such an addition amount that a surface resistivity of an electrically conductive sheet comprising the electrically conductive resin composition of the present invention of from $10^2$ to $10^{10}$, $\Omega$, preferably from $10^2$ to $10^6 \Omega$ is achieved, and it is preferably from 5 to 50 parts by mass, more preferably from 10 to 35 parts by mass based on 100 parts by mass of the thermoplastic resin. If the addition amount is less than 5 parts by mass, no sufficient electrical conductivity will be obtained and the surface resistivity tends to increase. If the addition amount exceeds 50 parts by mass, the uniform dispersibility with the resin tends to deteriorate, moldability tends to deteriorate, or physical properties such as mechanical strength tend to decrease. Further, if the surface resistivity exceeds $10^{10} \Omega$, no sufficient antistatic effect will be obtained, and if it is less than $10^2 \Omega$, electricity will easily flow in from the outside by e.g. electrostatic electricity, and electronic components may be destroyed.

For the electrically conductive resin composition, various additives such as a lubricant, a plasticizer, a thermal stabilizer, a processing aid, an inorganic filler and a delustering agent may be used as the case requires within a range not to impair properties required in the object of the present invention.

The electrically conductive resin composition may be formed into an electrically conductive sheet by laminating it with a substrate layer comprising at least one thermoplastic resin selected from the group consisting of an acrylonitrile/butadiene/styrene copolymer (ABS) resin, a polycarbonate resin and a polyalkylene terephthalate resin.

For the substrate layer, at least one thermoplastic resin selected from the group consisting of an acrylonitrile/butadiene/styrene copolymer (ABS) resin, a polycarbonate resin and a polyalkylene terephthalate resin.

The acrylonitrile/butadiene/styrene copolymer (ABS) resin which can be used for the substrate layer is one containing, as the main component, a copolymer composed essentially of the three components of acrylonitrile/butadiene/styrene, and a commercially available product may be used. It may, for example, be a copolymer obtained by block- or graft-polymerizing at least one monomer selected from an aromatic vinyl monomer or a vinyl cyanide monomer, to a diene rubber, or a blend product of such a copolymer. Here, the diene rubber may, for example, be a polybutadiene, a polyisoprene, an acrylonitrile/butadiene copolymer or a styrene/butadiene copolymer. The aromatic vinyl monomer may, for example, be styrene, $\alpha$-methyl styrene or various alkyl-substituted styrenes.

Further, the vinyl cyanide monomer may, for example, be acrylonitrile, methacrylonitrile or various halogen-substituted acrylonitriles. As a specific example of the above copolymer or the blend product of such a copolymer, an acrylonitrile/butadiene/styrene terpolymer or a polymer alloy obtained by kneading an acrylonitrile/styrene bipolymer with a polybutadiene, may, for example, be mentioned. Further, an acrylonitrile/styrene bipolymer containing no rubber component may also be mentioned.

The polycarbonate resin which can be used for the substrate layer is the same polycarbonate resin as in the electrically conductive resin composition.

The polyalkylene terephthalate resin which can be used for the substrate layer may be one obtained mainly from ethylene glycol or 1,4-butanediol as a glycol component and terephthalic acid or its dimethyl ether as a dicarboxylic acid component, and in addition, one having part of the copolymer monomer, i.e. the glycol component replaced with diethylene glycol, 1,4-tetramethylene glycol, 1,4-cyclohexane dimethanol or heptamethylene glycol, or the dicarboxylic acid component replaced with isophthalic acid, 1,5-naphthalene dicarboxylic acid or adipic acid, may be used. Preferred is a polyalkylene terephthalate resin having, as a glycol component, a 1,4-cyclohexane dimethanol component copolymerized in an amount of from 0.1 to 10 mol %, or a polyalkylene terephthalate resin having, as an acid component, an isophthalic acid component copolymerized in an amount of at least 1 mol % and at most 10 mol %, in view of moldability. It may, for example, be a polybutylene terephthalate resin (PET), a polybutylene terephthalate resin (PBT) or polytrimethylene terephthalate (PTT).

The polyalkylene terephthalate resin which can be used for the substrate layer is the same polyalkylene terephthalate resin as in the electrically conductive resin composition.

For the substrate layer, at least one resin selected from the group consisting of an acrylonitrile/butadiene/styrene copolymer (ABS) resin, a polycarbonate resin and a polyalkylene terephthalate resin may be used.

The thickness of the entire electrically conductive sheet is usually from 0.1 to 3.0 mm, preferably from 0.1 to 1.5 mm in view of the purpose of use. If the thickness of the entire sheet is less than 0.1 mm, the strength of a packaging container to be obtained by forming the electrically conductive sheet tends to be insufficient, and if it exceeds 3.0 mm, molding such as pressure forming, vacuum forming or hot plate pressing tends to be difficult.

When a surface layer of the electrically conductive resin composition is provided on one side or both sides of the substrate layer to prepare an electrically conductive sheet, the thickness of the surface layer on one side accounts for preferably at least 2%, particularly preferably at least 5% in the thickness of the entire electrically conductive sheet. If the thickness of the surface layer is less than 2%, the surface resistivity of a packaging container to be obtained by forming the electrically conductive sheet may be remarkably high.

In a case where the electrically conductive resin composition is laminated on the substrate layer to form an electrically conductive sheet, the thickness of the surface layer accounts for preferably at least 2%, particularly preferably at least 5% of the thickness of the entire sheet. If the thickness of the surface layer is less than 2%, the surface resistivity of a packaging container to be obtained by forming the electrically conductive sheet may be remarkably high.

To produce the electrically conductive resin composition, the entire or a part of the materials are kneaded and palletized by a known means such as an extruder. For kneading, the materials may be kneaded all at once, or a part thereof may be added stepwise and kneaded.

An electrically conductive sheet can be produced by using the electrically conductive resin composition by a known means such as an extruder or a calendaring machine. In a case where the electrically conductive resin composition is laminated on the substrate layer to form an electrically conductive sheet, it can be produced by a known production method using an extruder, a calendaring machine or the like from the electrically conductive resin composition alone or together with a thermoplastic resin to be the substrate layer. For example, the substrate layer and the electrically conductive resin composition are separately formed into sheets or films by separate extruders, and the sheets or films are laminated stepwise by a heat lamination method, a dry lamination method, an extrusion lamination method or the like, or a surface layer comprising the electrically conductive resin composition is laminated on at least one side of a preliminarily formed substrate layer sheet by e.g. extrusion coating. Further, an electrically conductive sheet can be obtained also by a method of obtaining a laminated sheet by multilayer coextrusion method using a multimanifold die or a feed block, and this method is preferred with a view to obtaining an electrically conductive sheet in a single step.

The electrically conductive sheet can be formed into a shape in accordance with the purpose of use by a known heat forming method such as vacuum forming, pressure forming or press molding.

The electrically conductive sheet can be suitably used, as a material of a packaging container for semiconductors such as IC and electronic components using IC, an embossed carrier tape, and an electronic component packaging having an electronic component accommodated in an embossed carrier tape and the upper part thereof heat-sealed with a cover tape.

EXAMPLES

Now, the present invention will be described in further detail with reference to Examples, but the present invention is by no means restricted thereto.

Materials used are shown below.
1) Ethylene copolymer
  EVA (ethylene/vinyl acetate copolymer):
    NUC copolymer 3195 manufactured by Nippon Unicar Company Limited
    EVAFLEX 40LX manufactured by Du Pont-Mitsui Polychemicals Co., Ltd.
    EVAFLEX 45LX manufactured by Du Pont-Mitsui Polychemicals Co., Ltd.
  EEA (ethylene/ethyl acrylate copolymer):
    NUC copolymer 6520 manufactured by Nippon Unicar Company Limited
    NUC copolymer 6940 manufactured by Nippon Unicar Company Limited
  EGMA-g-AS (ethylene/glycidyl methacrylate copolymer, AS resin graft polymer):
    MODIPER A4400 manufactured by NOF Corporation
2) Styrene copolymer
  SBBS (styrene/butylene/butene/styrene copolymer):
    TUFTEC P2000 manufactured by Asahi Kasei Corporation
  SEBS (styrene/ethylene/butylene/styrene copolymer):
    TUFTEC H1041 manufactured by Asahi Kasei Corporation
    TUFTEC H1043 manufactured by Asahi Kasei Corporation
  SEPS (styrene/ethylene/propylene/styrene copolymer):
    SEPTON S2063 manufactured by KURARAY CO., LTD
    SEPTON S2104 manufactured by KURARAY CO., LTD
3) Polycarbonate resin:
  Panlite L-1225 manufactured by TEIJIN CHEMICALS LTD.
4) Polyalkylene terephthalate resin:
  NOVADURAN 5010R8M manufactured by Mitsubishi Engineering-plastics Corporation
5) Carbon black
  KETJENBLACK EC manufactured by Lion Corporation
  DENKA BLACK Granular manufactured by Denki Kagaku Kogyo Kabushiki Kaisha (Evaluation Methods)

Physical properties of sheets prepared in Examples and Comparative Example were evaluated by the following methods, and the results are shown in Tables. In Tables, MD or the lengthwise direction represents the sheet flow direction, and TD or the crosswise direction represents the sheet width direction.

(Sealing Strength)

A commercially available cover tape (ALS-ATA manufactured by Denki Kagaku Kogyo Kabushiki Kaisha) was heat-sealed on the sheet at 140° C. and at 150° C. by a heat gradient tester (manufactured by Toyo Seiki Seisaku-sho, Ltd.) and left at rest at room temperature for 24 hours. The both ends of the heat-sealed portion of the sheet on which the cover tape was heat-sealed, were cut off so that the width was 15 mm, and the cover tape and the sheet were peeled off at a 180° degree angle at a rate of 200 mm/min to measure the peel strength. The obtained value was divided by the seal width (15 mm), and the resulting value was regarded as the sealing strength.

(Yield strength, breaking strength, tensile elongation, modulus in tension)

In accordance with JIS K7127, a tensile test was carried out at a tensile rate of 10 mm/min by an Instron type tensile tester using a No. 4 test specimen (MD direction).

(Folding Endurance)

In accordance with JIS-P8115, the sheet was repeatedly bent from side to side at a 135 degree angle by an MIT FOLDING AND ABRASION TESTER (manufactured by Toyo Seiki Seisaku-sho, Ltd.), and the number of flexings when the test specimen was broken was regarded as the folding endurance.

(Impact Strength)

Measured by a DuPont type impact tester manufactured by Toyo Seiki Seisaku-sho, Ltd., using a ½ inch hemispherical impact base under loads of 500 g and 1 kg at a temperature of 23° C. The result was represented by the 50% impact fracture energy (unit: J) as stipulated in JIS K7211.

(Surface Resistivity)

The surface resistivity was measured with respect to three points in the width direction by megohmmeter MODEL 800 (manufactured by ACL), and the logarithmic mean thereof was employed as a measured value.

(Tear Strength)

Evaluation was conductive in accordance with JIS K7128-3.

(Carbon Contamination Degree)

The sheet was fixed on a shake table, a frame of 19 mm×25 mm was placed thereon, and IC of QFP (quad flat package) 14 mm×20 mm-64 pin was accommodated therein, and the table was vibrated in a planner direction 800,000 times at a rate of 480 reciprocations per minute with a stroke of 30 mm, and the presence or absence of attachments to the lead portion of IC was judged. Evaluation standards are such that a state with substantially no attachment was rated to be excellent, a state with a small amount of attachments was rated to be good, and state with a large amount of attachments was rated to be poor.

Examples 1-1 to 1-19

Materials were melt kneaded in a blend ratio as identified in Table 1-1 or 1-2 by a twin screw extruder (PCM-40, manufactured by Ikegai) to obtain resin pellets. Further, the obtained resin pellets were melt kneaded to prepare a single layer sheet using a sheet forming apparatus comprising one 65 mm single screw extruder. The thickness of the obtained sheet was 300 μm. Carbon black was added based on 100 parts by mass of a thermoplastic resin comprising a polycarbonate resin and is an olefin copolymer.

Comparative Examples 1-1 to 1-3

A single layer sheet was prepared in the same manner as in Example 1-1 except that the blend ratio was as identified in Table 1-2.

Evaluation results in Examples and Comparative Examples are shown in Tables 1-1 and 1-2.

TABLE 1-1

| | | | Examples | | | | | | | | | | | |
|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-11 | 1-12 |
| Material | | | | | | | | | | | | | | |
| Polycarbonate resin | L1225 (mass %) | | 95 | 90 | 80 | 60 | 95 | 90 | 80 | 60 | 95 | 90 | 80 | 60 |
| Ethylene copolymer | Type | | | EVA | | | | EVA | | | | EVA | | |
| | Grade | | | NUC3195 | | | | EVAFLEX 40LX | | | | EVAFLEX 45LX | | |
| | Copolymer content (mass %) | | | 25 | | | | 41 | | | | 46 | | |
| | Addition amount (mass %) | | 5 | 10 | 20 | 40 | 5 | 10 | 20 | 40 | 5 | 10 | 20 | 40 |
| Carbon black (parts by mass) | DENKA BLACK granular | | 45 | 27 | 24 | — | 45 | 27 | 24 | — | 45 | 27 | 24 | — |
| | KETJENBLACK | | — | — | — | 10 | — | — | — | 10 | — | — | — | 10 |
| Items | | Unit | | | | | | Evaluated physical properties | | | | | | |
| Sealing strength | 140° C. sealing | N/mm | 0.18 | 0.24 | 0.39 | 0.52 | 0.16 | 0.19 | 0.52 | 0.61 | 0.24 | 0.31 | 0.42 | 0.65 |
| | 150° C. sealing | N/mm | 0.26 | 0.32 | 0.41 | 0.56 | 0.21 | 0.25 | 0.57 | 0.67 | 0.27 | 0.33 | 0.46 | 0.69 |
| Yield strength | MD | MPa | 58.7 | 49.1 | 42.9 | 35.8 | 57.8 | 48.5 | 41.6 | 35.4 | 59.0 | 49.5 | 42.6 | 36.1 |
| | TD | MPa | 60.4 | 45.8 | 36.8 | 33.5 | 59.1 | 46.1 | 34.7 | 33.6 | 58.1 | 45.7 | 35.1 | 33.3 |
| Breaking strength | MD | MPa | 56.0 | 50.0 | 45.4 | 36.5 | 55.0 | 47.5 | 41.4 | 34.6 | 56.1 | 50.1 | 45.8 | 36.5 |
| | TD | MPa | 55.1 | 46.0 | 36.8 | 33.4 | 54.7 | 46.1 | 36.2 | 33.6 | 54.3 | 43.9 | 35.1 | 32.0 |
| Tensile elongation | MD | % | 24 | 88 | 87 | 72 | 26 | 82 | 75 | 60 | 21 | 104 | 113 | 76 |
| | TD | % | 17 | 73 | 15 | 12 | 16 | 79 | 35 | 23 | 16 | 56 | 21 | 15 |
| Modulus in tension | MD | MPa | 2295 | 2190 | 1980 | 1597 | 2250 | 2130 | 1890 | 1553 | 2310 | 2180 | 1890 | 1589 |
| | TD | MPa | 2247 | 2100 | 1740 | 1531 | 2321 | 2130 | 1750 | 1553 | 2251 | 2090 | 1690 | 1524 |
| Folding endurance | MD | Times | 11 | 88 | 479 | 1069 | 12 | 76 | 567 | 554 | 10 | 88 | 957 | 1532 |
| | TD | Times | 7 | 51 | 29 | 239 | 7 | 68 | 221 | 496 | 6 | 73 | 178 | 365 |
| Impact strength | | J | 1.2 | 2.6 | 1.4 | 0.9 | 1.3 | 2.2 | 1.9 | 1.6 | 1.4 | 2.3 | 1.7 | 1.3 |
| Surface resistivity | | Ω | $4.0 \times 10^3$ | $1.2 \times 10^4$ | $2.3 \times 10^4$ | $5.8 \times 10^5$ | $5.3 \times 10^3$ | $1.4 \times 10^4$ | $3.0 \times 10^4$ | $6.2 \times 10^5$ | $3.3 \times 10^3$ | $2.1 \times 10^4$ | $7.2 \times 10^4$ | $8.6 \times 10^5$ |
| Tear strength | MD | N/mm | 157 | 184 | 152 | 133 | 160 | 165 | 159 | 120 | 157 | 180 | 152 | 131 |
| | TD | N/mm | 161 | 167 | 110 | 90 | 162 | 162 | 166 | 118 | 162 | 170 | 134 | 124 |
| Carbon contamination degree | | | Good | Good | Good | Good | Good | Good | Good | Good | Good | Good | Good | Good |

TABLE 1-2

| | | | Examples | | | | | | | Comparative Examples | | |
|---|---|---|---|---|---|---|---|---|---|---|---|---|
| | | | 1-13 | 1-14 | 1-15 | 1-16 | 1-17 | 1-18 | 1-19 | 1-1 | 1-2 | 1-3 |
| Material | | | | | | | | | | | | |
| Polycarbonate resin | L1225 (mass %) | | 95 | 90 | 60 | 95 | 90 | 80 | 60 | 100 | 55 | 80 |

TABLE 1-2-continued

| | | | Examples | | | | | | | Comparative Examples | | |
|---|---|---|---|---|---|---|---|---|---|---|---|---|
| | | | 1-13 | 1-14 | 1-15 | 1-16 | 1-17 | 1-18 | 1-19 | 1-1 | 1-2 | 1-3 |
| Ethylene copolymer | Type | | EEA | | | | EEA | | | — | EEA | EGMA-g-AS |
| | Grade | | NUC6520 | | | | NUC6940 | | | — | NUC6940 | MODIPER A4400 |
| | Copolymer content (mass %) | | 24 | | | | 35 | | | — | 35 | — |
| | Addition amount (mass %) | | 5 | 10 | 40 | 5 | 10 | 20 | 40 | — | 45 | 20 |
| Carbon black (parts by mass) | DENKA BLACK granular | | 45 | 27 | — | 45 | 27 | 24 | — | 30 | — | 24 |
| | KETJENBLACK | | — | — | 10 | — | — | — | 10 | — | 10 | — |

| Items | | Unit | Evaluated physical properties | | | | | | | Evaluated physical properties | | |
|---|---|---|---|---|---|---|---|---|---|---|---|---|
| Sealing strength | 140° C. sealing | N/mm | 0.24 | 0.30 | 0.53 | 0.31 | 0.38 | 0.43 | 0.57 | 0.05 | 0.56 | 0.23 |
| | 150° C. sealing | N/mm | 0.28 | 0.33 | 0.53 | 0.35 | 0.43 | 0.46 | 0.59 | 0.15 | 0.60 | 0.28 |
| Yield strength | MD | MPa | 59.1 | 48.3 | 35.2 | 58.1 | 49.5 | 39.4 | 36.1 | 60.8 | 36.0 | 40.7 |
| | TD | MPa | 60.1 | 44.5 | 32.4 | 60.2 | 44.1 | 24.8 | 32.1 | 60.0 | 31.5 | 31.1 |
| Breaking strength | MD | MPa | 55.4 | 49.1 | 35.8 | 57.0 | 48.3 | 39.2 | 35.2 | 56.5 | 35.1 | 39.6 |
| | TD | MPa | 55.3 | 44.0 | 32.1 | 56.1 | 44.0 | 24.8 | 32.1 | 55.4 | 24.5 | 31.1 |
| Tensile elongation | MD | % | 22 | 87 | 63 | 25 | 61 | 45 | 23 | 51 | 20 | 34 |
| | TD | % | 15 | 63 | 46 | 13 | 7 | 3 | 3 | 37 | 3 | 5 |
| Modulus in tension | MD | MPa | 2284 | 2170 | 1582 | 2291 | 2170 | 1800 | 1582 | 2950 | 1550 | 1820 |
| | TD | MPa | 2249 | 2020 | 1473 | 2250 | 2190 | 1560 | 1497 | 2940 | 1350 | 1610 |
| Folding endurance | MD | Times | 15 | 69 | 425 | 13 | 49 | 153 | 357 | 29 | 368 | 242 |
| | TD | Times | 9 | 49 | 154 | 8 | 11 | 10 | 75 | 27 | 55 | 4 |
| Impact strength | | J | 1.3 | 2.4 | 1.0 | 1.3 | 1.0 | 0.7 | 0.5 | 2.2 | 0.3 | 0.5 |
| Surface resistivity | | Ω | $5.4 \times 10^3$ | $1.4 \times 10^4$ | $6.3 \times 10^5$ | $4.2 \times 10^3$ | $4.5 \times 10^3$ | $1.5 \times 10^4$ | $7.8 \times 10^5$ | $2.5 \times 10^3$ | $2.5 \times 10^5$ | $1.5 \times 10^4$ |
| Tear strength | MD | N/mm | 159 | 170 | 124 | 155 | 196 | 144 | 143 | 189 | 145 | 166 |
| | TD | N/mm | 158 | 155 | 113 | 158 | 147 | 107 | 93 | 191 | 65 | 81 |
| Carbon contamination degree | | | Good | Good | Good | Good | Good | Good | Good | Excellent | Poor | Good |

Examples 2-1 to 2-14

Materials were melt kneaded by a twin screw extruder (PCM-40, manufactured by Ikegai) in a blend ratio as identified in Table 2-1 or 2-2 to obtain resin pellets. Further, the obtained resin pellets were melt kneaded to prepare a single layer sheet by using a sheet forming apparatus comprising one 65 mm single screw extruder. The thickness of the obtained sheet was 300 μm.

Comparative Examples 2-1 to 2-4

A single layer sheet was prepared in the same manner as in Example 2-1 except that the blend ratio was as identified in Table 2-2. In Comparative Example 2-3, the resin pellets had poor moldability, and no sheet having good appearance could be obtained.

The evaluation results in Examples and Comparative Examples are shown in Tables 2-1 and 2-2.

TABLE 2-1

| | | | Examples | | | | | | |
|---|---|---|---|---|---|---|---|---|---|
| | | | 2-1 | 2-2 | 2-3 | 2-4 | 2-5 | 2-6 | 2-7 |
| Material | | | | | | | | | |
| Polycarbonate resin | L1225 (mass %) | | 90 | 90 | 80 | 80 | 95 | 97 | 95 |
| Styrene copolymer | Type | | | SEBS | | | SEBS | | SBBS |
| | Grade | | | TUFTEC H1043 | | | TUFTEC H1041 | | TUFTEC P2000 |
| | Styrene content (mass %) | | | 67 | | | 30 | | 67 |
| | Addition amount (mass %) | | 10 | 10 | 20 | 20 | 5 | 3 | 5 |

TABLE 2-1-continued

| Carbon black | KETJENBLACK EC (parts by mass) | | | | | 10 | | |
|---|---|---|---|---|---|---|---|---|
| | DENKA BLACK granular (parts by mass) | 45.0 | 30.0 | 27.0 | | 31.0 | 30.0 | 30.0 |

| Items | | Unit | Evaluated physical properties | | | | | |
|---|---|---|---|---|---|---|---|---|
| Sealing strength | 140° C. sealing | N/mm | 0.34 | 0.35 | 0.40 | 0.39 | 0.19 | 0.18 | 0.22 |
| | 150° C. sealing | N/mm | 0.47 | 0.46 | 0.52 | 0.50 | 0.29 | 0.25 | 0.31 |
| Yield strength | Flow direction | MPa | 57.0 | 55.0 | 52.0 | 53.1 | 54.6 | 58.1 | 57.0 |
| | Width direction | MPa | 51.2 | 50.7 | 44.4 | 43.1 | 52.6 | 53.9 | 52.8 |
| Breaking strength | Flow direction | MPa | 50.1 | 51.2 | 47.4 | 48.5 | 54.7 | 53.9 | 52.0 |
| | Width direction | MPa | 48.0 | 48.9 | 44.3 | 42.1 | 52.2 | 49.1 | 48.9 |
| Tensile elongation | Flow direction | % | 30 | 45 | 49 | 55 | 80 | 30 | 39 |
| | Width direction | % | 13 | 15 | 12 | 10 | 61 | 13 | 12 |
| Modulus in tension | Flow direction | MPa | 1590 | 2540 | 2400 | 2420 | 2470 | 2830 | 2550 |
| | Width direction | MPa | 2550 | 2460 | 2250 | 2310 | 2440 | 2780 | 2460 |
| Folding endurance | Flow direction | Times | 60 | 79 | 58 | 55 | 67 | 43 | 50 |
| | Width direction | Times | 25 | 31 | 20 | 33 | 37 | 35 | 30 |
| Impact strength | | J | 1.66 | 1.88 | 0.60 | 0.65 | 2.42 | 2.51 | 2.40 |
| Surface resistivity | | Ω | 3500 | 6700 | 13000 | 12000 | 14000 | 11000 | 10000 |
| Tear strength | Flow direction | N/mm | 188 | 212 | 190 | 185 | 196 | 225 | 203 |
| | Width direction | N/mm | 151 | 212 | 152 | 145 | 184 | 220 | 181 |
| Carbon contamination degree | | | Good | Good | Good | Good | Good | Good | Good |

| | | | Examples | | | |
|---|---|---|---|---|---|---|
| | | | 2-8 | 2-9 | 2-10 | 2-11 |
| Material | | | | | | |
| Polycarbonate resin | L1225 (mass %) | | 90 | 80 | 70 | 65 |
| Styrene copolymer | Type | | | SBBS | | |
| | Grade | | | TUFTEC P2000 | | |
| | Styrene content (mass %) | | | 67 | | |
| | Addition amount (mass %) | | 10 | 20 | 30 | 35 |
| Carbon black | KETJENBLACK EC (parts by mass) | | | | | |
| | DENKA BLACK granular (parts by mass) | | 30.0 | 27.0 | 30.0 | 30.0 |

| Items | | Unit | Evaluated physical properties | | | |
|---|---|---|---|---|---|---|
| Sealing strength | 140° C. sealing | N/mm | 0.24 | 0.40 | 0.42 | 0.43 |
| | 150° C. sealing | N/mm | 0.35 | 0.49 | 0.52 | 0.55 |
| Yield strength | Flow direction | MPa | 55.0 | 52.3 | 48.0 | 45.0 |
| | Width direction | MPa | 51.7 | 45.8 | 44.5 | 40.0 |

TABLE 2-1-continued

| | | | | | | |
|---|---|---|---|---|---|---|
| Breaking strength | Flow direction | MPa | 51.0 | 48.5 | 45.0 | 43.5 |
| | Width direction | MPa | 48.6 | 48.5 | 42.0 | 38.1 |
| Tensile elongation | Flow direction | % | 38 | 66 | 78 | 65 |
| | Width direction | % | 18 | 10 | 13 | 8 |
| Modulus in tension | Flow direction | MPa | 2540 | 2380 | 2370 | 2240 |
| | Width direction | MPa | 2450 | 2250 | 2190 | 2210 |
| Folding endurance | Flow direction | Times | 62 | 243 | 250 | 169 |
| | Width direction | Times | 28 | 21 | 15 | 7 |
| Impact strength | | J | 2.30 | 1.02 | 0.65 | 0.50 |
| Surface resistivity | | Ω | 10000 | 17000 | 13000 | 12000 |
| Tear strength | Flow direction | N/mm | 183 | 169 | 161 | 145 |
| | Width direction | N/mm | 162 | 151 | 145 | 105 |
| Carbon contamination degree | | | Good | Good | Good | Good |

TABLE 2-2

| | | | Examples | | | Comparative Examples | | | |
|---|---|---|---|---|---|---|---|---|---|
| | | | 2-12 | 2-13 | 2-14 | 2-1 | 2-2 | 2-3 | 2-4 |
| Material | | | | | | | | | |
| Polycarbonate resin | L1225 (mass %) | | 90 | 80 | 90 | 100 | 55 | 80 | 80 |
| Styrene copolymer | Type | | SEPS | SEPS | | | | | SEBS |
| | Grade | | SEPTON S2104 | SEPTON S2063 | | | | | TUFTEC H1043 |
| | Styrene content (mass %) | | 65 | 13 | | | | | 67 |
| | Addition amount (mass %) | | 10 | 20 | 10 | | 45 | 20 | 20 |
| Carbon black | KETJENBLACK EC (parts by mass) | | | | | | | | 2 |
| | DENKA BLACK granular (parts by mass) | | | 30.0 | 27.0 | 30.0 | 30.0 | 30 | 65 |

| Items | | Unit | Evaluated physical properties | | | Evaluated physical properties | | | |
|---|---|---|---|---|---|---|---|---|---|
| Sealing strength | 140° C. sealing | N/mm | 0.29 | 0.29 | 0.09 | 0.05 | 0.44 | — | 0.39 |
| | 150° C. sealing | N/mm | 0.38 | 0.42 | 0.17 | 0.14 | 0.53 | — | 0.50 |
| Yield strength | Flow direction | MPa | 54.0 | 50.3 | 49.8 | 60.8 | 42.0 | — | 53.0 |
| | Width direction | MPa | 48.3 | 42.6 | 40.9 | 60.0 | 41.3 | — | 46.9 |
| Breaking strength | Flow direction | MPa | 50.8 | 47.2 | 48.6 | 56.5 | 41.0 | — | 49.0 |
| | Width direction | MPa | 47.7 | 42.6 | 40.9 | 55.4 | 37.9 | — | 48.0 |
| Tensile elongation | Flow direction | % | 50 | 62 | 53 | 51 | 63 | — | 29 |
| | Width direction | % | 23 | 22 | 5 | 37 | 5 | — | 31 |
| Modulus in tension | Flow direction | MPa | 2480 | 2330 | 2230 | 2950 | 2190 | — | 2560 |
| | Width direction | MPa | 2370 | 2210 | 2130 | 2940 | 2050 | — | 2310 |
| Folding endurance | Flow direction | Times | 97 | 335 | 161 | 29 | 189 | — | 109 |
| | Width direction | Times | 47 | 64 | 6 | 27 | 3 | — | 61 |

TABLE 2-2-continued

|  |  | Examples | | | Comparative Examples | | | |
| --- | --- | --- | --- | --- | --- | --- | --- | --- |
|  |  | 2-12 | 2-13 | 2-14 | 2-1 | 2-2 | 2-3 | 2-4 |
| Impact strength | J | 2.51 | 1.72 | 0.45 | 2.16 | 0.39 | — | 1.50 |
| Surface resistivity | Ω | 6700 | 13000 | 6400 | 5500 | 9000 | — | >10$^{10}$ |
| Tear strength | Flow direction N/mm | 206 | 215 | 186 | 189 | 121 | — | 191 |
|  | Width direction N/mm | 210 | 174 | 110 | 191 | 89 | — | 184 |
| Carbon contamination degree |  | Good | Good | Good | Excellent | Poor | — | Excellent |

Examples 3-1 to 3-14

Materials were melt kneaded by a twin screw extruder (PCM-40, manufactured by Ikegai) in a blend ratio as identified in Table 3-1 or 3-2 to obtain resin pellets. Further, the obtained resin pellets were melt kneaded to prepare a single layer sheet by using a sheet forming apparatus comprising one 65 mm single screw extruder. The thickness of the obtained sheet was 300 μm. Carbon black was added based on 100 parts by mass of a thermoplastic resin comprising a polycarbonate resin, a polyalkylene terephthalate resin and an olefin copolymer.

Comparative Examples 3-1 to 3-6

A single layer sheet was prepared in the same manner as in Example 3-1 except that the blend ratio was as identified in Table 3-2. In Comparative Example 3-2, it was difficult to obtain a sheet with good appearance.

The evaluation results in Examples and Comparative Examples are shown in Tables 3-1 and 3-2.

TABLE 3-1

|  |  |  | Examples | | | | | | | | | | |
| --- | --- | --- | --- | --- | --- | --- | --- | --- | --- | --- | --- | --- | --- |
|  |  |  | 3-1 | 3-2 | 3-3 | 3-4 | 3-5 | 3-6 | 3-7 | 3-8 | 3-9 | 3-10 | 3-11 |
| Material |  |  |  |  |  |  |  |  |  |  |  |  |  |
| Polycarbonate resin (mass %) |  |  | 56 | 67 | 54 | 56 | 65 | 75 | 50 | 43 | 54 | 54 | 56 |
| Polyalkylene terephthalate resin (mass %) |  |  | 24 | 29 | 36 | 24 | 15 | 5 | 22 | 22 | 36 | 36 | 24 |
| Ethylene copolymer | Type |  | EVA | | | EVA | | | | | EVA | | |
|  | Grade |  | NUC3195 | | | EVAFLEX 40LX | | | | | EVAFLEX 45LX | | |
|  | Copolymer content (mass %) |  | 25 | | | 41 | | | | | 46 | | |
|  | Blended amount (mass %) |  | 20 | 4 | 10 | 20 | 20 | 20 | 28 | 35 | 10 | 10 | 20 |
| Carbon black (parts by mass) | KETJENBLACK EC |  | — | — | — | — | — | — | — | — | — | — | 10 |
|  | DENKA BLACK granular |  | 27 | 30 | 30 | 30 | 30 | 30 | 30 | 30 | 45 | 30 | — |
| Items |  | Unit | Evaluated physical properties | | | | | | | | | | |
| Sealing strength | 140° C. sealing | N/mm | 0.39 | 0.18 | 0.20 | 0.52 | 0.51 | 0.51 | 0.55 | 0.57 | 0.29 | 0.31 | 0.42 |
|  | 150° C. sealing | N/mm | 0.41 | 0.22 | 0.25 | 0.57 | 0.55 | 0.56 | 0.59 | 0.59 | 0.32 | 0.33 | 0.46 |
| Yield strength | Lengthwise direction | MPa | 42.9 | 43.5 | 48.5 | 41.6 | 41.5 | 41.7 | 39.8 | 38.7 | 50.1 | 49.5 | 42.6 |
|  | Crosswise direction | MPa | 36.8 | 38.9 | 46.1 | 34.7 | 34.8 | 35.0 | 34.5 | 33.5 | 48.1 | 45.7 | 35.1 |
| Breaking strength | Lengthwise direction | MPa | 45.4 | 47.1 | 47.5 | 41.4 | 40.9 | 41.0 | 41.5 | 39.8 | 52.0 | 50.1 | 45.8 |
|  | Crosswise direction | MPa | 36.8 | 38.9 | 46.1 | 36.2 | 35.8 | 36.1 | 36.0 | 34.7 | 45.5 | 43.9 | 35.1 |
| Tensile elongation | Lengthwise direction | % | 87 | 55 | 82 | 75 | 92 | 80 | 90 | 121 | 45 | 104 | 113 |
|  | Crosswise direction | % | 15 | 45 | 79 | 35 | 41 | 32 | 25 | 35 | 30 | 56 | 21 |
| Modulus in tension | Lengthwise direction | MPa | 1980 | 2150 | 2130 | 1890 | 1910 | 1900 | 1850 | 1780 | 2310 | 2180 | 1890 |
|  | Crosswise direction | MPa | 1740 | 2110 | 2130 | 1750 | 1830 | 1850 | 1710 | 1580 | 2250 | 2090 | 1690 |
| Folding endurance | Lengthwise direction | Times | 479 | 85 | 76 | 567 | 551 | 513 | 654 | 659 | 55 | 88 | 957 |

TABLE 3-1-continued

|  |  |  | Examples |  |  |  |  |  |  |  |  |  |  |
|---|---|---|---|---|---|---|---|---|---|---|---|---|---|
|  |  |  | 3-1 | 3-2 | 3-3 | 3-4 | 3-5 | 3-6 | 3-7 | 3-8 | 3-9 | 3-10 | 3-11 |
|  | Crosswise direction | Times | 29 | 42 | 68 | 221 | 221 | 189 | 165 | 148 | 35 | 73 | 178 |
|  | Impact strength | J | 1.40 | 2.11 | 2.17 | 1.91 | 1.95 | 1.99 | 1.70 | 1.34 | 1.88 | 2.31 | 1.71 |
|  | Surface resistivity | $\Omega$ | $2.3 \times 10^4$ | $2.4 \times 10^3$ | $1.4 \times 10^4$ | $3.0 \times 10^4$ | $3.5 \times 10^3$ | $3.4 \times 10^3$ | $3.2 \times 10^3$ | $3.5 \times 10^3$ | $1.5 \times 10^3$ | $2.1 \times 10^4$ | $7.2 \times 10^4$ |
| Tear strength | Lengthwise direction | N/mm | 152 | 171 | 165 | 159 | 163 | 160 | 165 | 168 | 155 | 180 | 152 |
|  | Crosswise direction | N/mm | 110 | 168 | 162 | 166 | 162 | 164 | 148 | 128 | 131 | 170 | 134 |
|  | Carbon contamination degree |  | Good | Excellent | Good | Good | Good | Good | Good | Good | Good | Good | Good |

TABLE 3-2

|  |  |  | Examples |  |  | Comparative Examples |  |  |  |  |  |
|---|---|---|---|---|---|---|---|---|---|---|---|
|  |  |  | 3-12 | 3-13 | 3-14 | 3-1 | 3-2 | 3-3 | 3-4 | 3-5 | 3-6 |
| Material |  |  |  |  |  |  |  |  |  |  |  |
| Polycarbonate resin (mass %) |  |  | 54 | 67 | 54 | 42 | 30 | 38.5 | 56 | 56 | 56 |
| Polyalkylene terephthalate resin (mass %) |  |  | 36 | 29 | 36 | 28 | 50 | 16.5 | 24 | 24 | 24 |
| Ethylene copolymer | Type |  | EEA | EEA | — |  |  | EVA |  |  | EGMA-a-AS |
|  | Grade |  | NUC6520 | NUC6940 | — |  |  | EVAFLEX 40LX |  |  | MODIPER A4400 |
|  | Copolymer content (mass %) |  | 24 | 35 | — |  |  | 41 |  |  | — |
|  | Blended amount (mass %) |  | 10 | 4 | 10 | — | 20 | 45 | 20 | 20 | 20 |
| Carbon black (parts by mass) | KETJENBLACK EC |  | — | — | — | — | — | — | 3 | — | — |
|  | DENKA BLACK granular |  | 30 | 30 | 30 | 30 | 30 | 30 | — | 60 | 30 |

| Items |  | Unit | Evaluated physical properties |  |  |  | Evaluated physical properties |  |  |  |  |
|---|---|---|---|---|---|---|---|---|---|---|---|
| Sealing strength | 140° C. sealing | N/mm | 0.30 | 0.16 | 0.38 | 0.05 | Poor appearance of sheet | 0.55 | 0.53 | 0.49 | 0.24 |
|  | 150° C. sealing | N/mm | 0.33 | 0.20 | 0.43 | 0.15 |  | 0.58 | 0.59 | 0.55 | 0.27 |
| Yield strength | Lengthwise direction | MPa | 48.3 | 39.2 | 49.5 | 60.8 |  | 0.38 | 40.5 | 43.5 | 401 |
|  | Crosswise direction | MPa | 44.5 | 34.9 | 44.1 | 60 |  | 28.1 | 35.4 | 33.8 | 30.8 |
| Breaking strength | Lengthwise direction | MPa | 49.1 | 41.1 | 48.3 | 56.5 | Poor appearance of sheet | 37.5 | 40.9 | 45.2 | 37.5 |
|  | Crosswise direction | MPa | 44.0 | 35.0 | 44.0 | 55.4 |  | 29.5 | 38.9 | 36.8 | 32.1 |
| Tensile elongation | Lengthwise direction | % | 87 | 49.7 | 61.0 | 51 |  | 151 | 105 | 55 | 38 |
|  | Crosswise direction | % | 18 | 40.0 | 20.0 | 37 |  | 15 | 88 | 28 | 7 |
| Modulus in tension | Lengthwise direction | MPa | 2170 | 1930 | 2170 | 2950 |  | 1750 | 1850 | 1920 | 1790 |
|  | Crosswise direction | MPa | 2020 | 1890 | 2190 | 2940 |  | 1490 | 1810 | 1740 | 1670 |
| Folding endurance | Lengthwise direction | Times | 69 | 75.0 | 49.0 | 29 |  | 521 | 589 | 432 | 185 |
|  | Crosswise direction | Times | 49 | 38.0 | 11.0 | 27 |  | 89 | 452 | 152 | 7 |
|  | Impact strength | J | 2.42 | 1.90 | 0.96 | 2.16 |  | 0.89 | 1.99 | 1.78 | 0.50 |
|  | Surface resistivity | $\Omega$ | $1.4 \times 10^4$ | $3.5 \times 10^3$ | $4.5 \times 10^3$ | $2.5 \times 10^3$ |  | $3.4 \times 10^3$ | $1.4 \times 10^{12}<$ | $1.0 \times 10^3$ | $2.5 \times 10^3$ |
| Tear strength | Lengthwise direction | N/mm | 170 | 155 | 196 | 189 |  | 155 | 161 | 169 | 189 |
|  | Crosswise direction | N/mm | 121 | 151 | 147 | 191 |  | 105 | 165 | 155 | 66 |
|  | Carbon contamination degree |  | Good | Excellent | Good | Excellent |  | Good | Excellent | Poor | Good |

Examples 4-1 to 4-14

Materials were melt kneaded by a twin screw extruder (PCM-40 manufactured by Ikegai) in a blend ratio as identified in Table 4-1 or 4-2 to obtain resin pellets. Further, the obtained resin pellets were melt kneaded to prepare a single layer sheet by using a sheet forming apparatus comprising one 65 mm single screw extruder. The thickness of the obtained sheet was 300 μm. Carbon black was added based on 100 parts by mass by a thermoplastic resin comprising a polycarbonate resin, a polyalkylene terephthalate resin and a styrene copolymer.

Comparative Examples 4-1 to 4-5

A single layer sheet was prepared in the same manner as in Example 4-1 except that the blend ratio was as identified in Table 4-2.

The evaluation results in Examples and Comparative Examples are shown in Tables 4-1 and 4-2. In Comparative Example 4-2, the elongation unevenness was significant at the time of film formation, and in Comparative Example 4-4, the resin pellets had poor flowability, and it was difficult to obtain a sheet with good appearance.

TABLE 4-1

| | | | Examples | | | | | | | | | |
|---|---|---|---|---|---|---|---|---|---|---|---|---|
| | | | 4-1 | 4-2 | 4-3 | 4-4 | 4-5 | 4-6 | 4-7 | 4-8 | 4-9 | 4-10 |
| Material | | | | | | | | | | | | |
| Polycarbonate resin | L1225 (mass %) | | 63 | 54 | 56 | 56 | 68 | 54 | 56 | 75 | 49 | 45 |
| Polyalkylene terephthalate resin | 5010R8M (mass %) | | 27 | 36 | 24 | 24 | 29 | 36 | 24 | 5 | 21 | 20 |
| Styrene copolymer | Type Grade | | SEBS TUFTEC H1043 | | | | | | SBBS TUFTEC P2000 | | | |
| | St content (mass %) | | 67 | 67 | 67 | 67 | 67 | 67 | 67 | | 67 | 67 |
| | Addition amount (mass %) | | 10 | 10 | 20 | 20 | 3 | 10 | 20 | 20 | 30 | 35 |
| Carbon black | KETJENBLACK EC (parts by mass) | | — | — | — | 10 | — | — | — | — | — | — |
| | DENKA BLACK granular (parts by mass) | | 45 | 30.0 | 27.0 | — | 30.0 | 30.0 | 27.0 | 30.0 | 30.0 | 30.0 |
| Items | | Unit | Evaluated physical properties | | | | | | | | | |
| Sealing strength | 140° C. sealing | N/mm | 0.41 | 0.42 | 0.48 | 0.48 | 0.18 | 0.28 | 0.48 | 0.42 | 0.52 | 0.53 |
| | 150° C. sealing | N/mm | 0.49 | 0.50 | 0.57 | 0.52 | 0.21 | 0.39 | 0.54 | 0.55 | 0.54 | 0.57 |
| Yield strength | Flow direction | MPa | 62.1 | 60.1 | 56.9 | 56.8 | 63.2 | 60.1 | 57.2 | 53.1 | 52.3 | 49.7 |
| | Width direction | MPa | 55.3 | 54.9 | 48.1 | 47.1 | 58.1 | 56.0 | 49.6 | 46.8 | 48.1 | 44.3 |
| Breaking strength | Flow direction | MPa | 49.0 | 50.2 | 46.6 | 46.0 | 52.8 | 50.2 | 47.7 | 48.0 | 44.1 | 42.6 |
| | Width direction | MPa | 51.0 | 52.5 | 48.0 | 45.5 | 54.0 | 52.3 | 52.5 | 49.9 | 45.4 | 41.1 |
| Tensile elongation | Flow direction | % | 10 | 15 | 16 | 18 | 12 | 13 | 22 | 55 | 26 | 21 |
| | Width direction | % | 5 | 5 | 4 | 8 | 7 | 6 | 3 | 8 | 4 | 3 |
| Modulus in tension | Flow direction | MPa | 2560 | 2500 | 2360 | 2410 | 2780 | 2490 | 2340 | 2350 | 2320 | 2190 |
| | Width direction | MPa | 2460 | 2470 | 2260 | 2560 | 2740 | 2460 | 2250 | 2270 | 2210 | 2130 |
| Folding endurance | Flow direction | Times | 41 | 54 | 40 | 41 | 30 | 43 | 168 | 221 | 173 | 117 |
| | Width direction | Times | 21 | 23 | 16 | 25 | 25 | 21 | 16 | 25 | 15 | 6 |
| Impact strength | | J | 1.50 | 2.55 | 0.82 | 0.95 | 3.46 | 3.13 | 1.72 | 1.05 | 1.01 | 0.69 |
| Surface resistivity | | Ω | $9.8 \times 10^4$ | $5.3 \times 10^4$ | $8.0 \times 10^4$ | $1.3 \times 10^4$ | $1.4 \times 10^4$ | $5.2 \times 10^3$ | $4.3 \times 10^4$ | $1.5 \times 10^5$ | $3.5 \times 10^4$ | $5.6 \times 10^4$ |
| Tear strength | Flow direction | N/mm | 193 | 220 | 196 | 188 | 232 | 189 | 175 | 170 | 166 | 149 |
| | Width direction | N/mm | 145 | 207 | 148 | 145 | 216 | 155 | 148 | 155 | 142 | 103 |
| Carbon contamination degree | | | Good | Good | Good | Good | Excellent | Good | Good | Good | Good | Good |

TABLE 4-2

| | | | Examples | | | | Comparative Examples | | | |
|---|---|---|---|---|---|---|---|---|---|---|
| | | | 4-11 | 4-12 | 4-13 | 4-14 | 4-1 | 4-2 | 4-3 | 4-4 | 4-5 |

| Material | | | | | | | | | | | |
|---|---|---|---|---|---|---|---|---|---|---|---|
| Polycarbonate resin | L1225 (mass %) | | 43 | 54 | 56 | 54 | 42 | 30 | 38.5 | 56 | 56 |
| Polyalkylene terephthalate resin | 5010R8M (mass %) | | 22 | 36 | 24 | 36 | 28 | 50 | 16.5 | 24 | 24 |
| Styrene copolymer | Type | | SBBS | SEPS | SEPS | SEPS | — | — | SEBS | SEBS | SEBS |
| | Grade | | TUFTEC P2000 | SEPTON S2104 | SEPTON S2104 | SEPTON S2063 | — | — | TUFTEC H1043 | TUFTEC H1043 | TUFTEC H1043 |
| | St content (mass %) | | 67 | 65 | 65 | 13 | — | 67 | 67 | 67 | 67 |
| | Addition amount (mass %) | | 35 | 10 | 20 | 10 | — | 20 | 45 | 20 | 20 |
| Carbon black | KETJENBLACK EC (parts by mass) | | — | — | — | — | — | — | — | — | 2 |
| | DENKA BLACK granular (parts by mass) | | 30.0 | 30.0 | 27.0 | 30.0 | 30.0 | 30.0 | 30 | 65 | — |

| Items | | Unit | Evaluated physical properties | | | | Evaluated physical properties | | | | |
|---|---|---|---|---|---|---|---|---|---|---|---|
| Sealing strength | 140° C. sealing | N/mm | 0.55 | 0.35 | 0.35 | 0.11 | 0.05 | Poor appearance of sheet | 0.54 | Poor appearance of sheet | 0.48 |
| | 150° C. sealing | N/mm | 0.57 | 0.42 | 0.46 | 0.10 | 0.15 | | 0.55 | | 0.52 |
| Yield strength | Flow direction | MPa | 48.3 | 59.1 | 55.0 | 54.5 | 60.8 | | 45.8 | | 57.5 |
| | Width direction | MPa | 43.5 | 52.3 | 46.2 | 44.3 | 60.0 | | 44.6 | | 50.8 |
| Breaking strength | Flow direction | MPa | 42.5 | 50.0 | 46.4 | 47.8 | 56.5 | Poor appearance of sheet | 40.2 | Poor appearance of sheet | 48.3 |
| | Width direction | MPa | 41.6 | 51.3 | 45.8 | 44.0 | 55.4 | | 40.8 | | 51.6 |
| Tensile elongation | Flow direction | % | 18 | 17 | 21 | 18 | 51 | | 21 | | 13 |
| | Width direction | % | 4 | 7 | 7 | 4 | 37 | | 4 | | 12 |
| Modulus in tension | Flow direction | MPa | 2050 | 2430 | 2290 | 2190 | 2950 | | 2150 | | 2520 |
| | Width direction | MPa | 2030 | 2380 | 2210 | 2140 | 2940 | | 2060 | | 2310 |
| Folding endurance | Flow direction | Times | 125 | 67 | 231 | 111 | 29 | | 133 | | 77 |
| | Width direction | Times | 5 | 37 | 50 | 6 | 27 | | 4 | | 41 |
| Impact strength | | J | 0.70 | 3.43 | 2.35 | 0.53 | 2.16 | | 0.54 | | 2.13 |
| Surface resistivity | | Ω | $4.6 \times 10^4$ | $3.5 \times 10^4$ | $6.8 \times 10^4$ | $2.6 \times 10^4$ | $2.5 \times 10^3$ | | $4.6 \times 10^4$ | | $1.4 \times 10^{12}<$ |
| Tear strength | Flow direction | N/mm | 148 | 211 | 220 | 192 | 189 | | 135 | | 195 |
| | Width direction | N/mm | 105 | 205 | 171 | 108 | 191 | | 67 | | 183 |
| Carbon contamination degree | | | Good | Good | Good | Good | Excellent | | Poor | | Excellent |

The electrically conductive sheet comprising the electrically conductive resin composition provided by the present invention is excellent in sealing properties with a cover tape, and a molded product with a cover tape can reduce contamination of an electronic component as a content by friction with the electronic component.

INDUSTRIAL APPLICABILITY

The electrically conductive sheet comprising the electrically conductive resin composition of the present invention has favorable sealing properties with a cover tape and is thereby suitable for high speed packaging and high speed mounting and further, a molded product to be obtained is less likely to contaminate an electronic component and is applicable as an electronic component package such as an embossed carrier tape with high precision.

The entire disclosures of Japanese Patent Application No. 2006-221351 filed on Aug. 15, 2006, Japanese Patent Application No. 2006-240933 filed on Sep. 6, 2006, Japanese Patent Application No. 2006-293450 filed on Oct. 30, 2006 and Japanese Patent Application No. 2006-294947 filed on Oct. 30, 2006 including specifications, claims and summaries are incorporated herein by reference in their entireties.

The invention claimed is:

1. An electrically conductive resin composition comprising 100 parts by mass of a thermoplastic resin containing from 60 to 97 mass % of a polycarbonate resin and from 3 to 40 mass % of at least one hydrocarbon copolymer selected from the group consisting of an olefin copolymer and a styrene copolymer, and from 5 to 50 parts by mass of carbon black, wherein the olefin copolymer is an ethylene/ethyl acetate copolymer, and the styrene copolymer comprises at least one member selected from the group consisting of a styrene/diene block copolymer resin, a resin having a styrene/diene block copolymer hydrogenated and a styrene/butadiene/butyrene/styrene block copolymer resin.

2. An electrically conductive resin composition comprising 100 parts by mass of a thermoplastic resin containing from 33 to 93 mass % of a polycarbonate resin, from 3 to 44 mass % of a polyalkylene terephthalate resin and from 3 to 40 mass % of at least one hydrocarbon copolymer selected from the group consisting of an olefin copolymer and a styrene copolymer, and from 5 to 50 parts by mass of carbon black, wherein the olefin copolymer is an ethylene/ethyl acetate copolymer, and the styrene copolymer comprises at least one member selected from the group consisting of a styrene/diene block copolymer resin, a resin having a styrene/diene block copolymer hydrogenated and a styrene/butadiene/butyrene/styrene block copolymer resin.

3. An electrically conductive sheet comprising the ally conductive resin composition as defined in claim 1.

4. An electrically conductive sheet comprising the electrically conductive resin composition as defined in claim 2.

5. An electrically conductive sheet, comprising a substrate layer containing at least one thermoplastic resin selected from the group consisting of an acrylonitrile/butadiene/styrene copolymer (ABS) resin, a polycarbonate resin and a polyalkylene terephthalate resin, and a layer of the electrically conductive resin composition as defined in claim 1 formed on one side or both sides of the substrate layer.

6. An electrically conductive sheet, comprising a substrate layer containing at least one thermoplastic resin selected from the group consisting of an acrylonitrile/butadiene/styrene copolymer (ABS) resin, a polycarbonate resin and a polyalkylene terephthalate resin, and a layer of the electrically conductive resin composition as defined in claim 2 formed on one side or both sides of the substrate layer.

7. The electrically conductive sheet according to claim 3, which has a surface resistivity of from $10^2$ to $10^{10} \Omega$.

8. The electrically conductive sheet according to claim 4, which has a surface resistivity of from $10^2$ to $10^{10} \Omega$.

9. The electrically conductive sheet according to claim 5, which has a surface resistivity of from $10^2$ to $10^{10} \Omega$.

10. The electrically conductive sheet according to claim 6, which has a surface resistivity of from $10^2$ to $10^{10} \Omega$.

11. A container for packaging an electronic component, using the electrically conductive sheet as defined in claim 5.

12. A container for packaging an electronic component, using the electrically conductive sheet as defined in claim 6.

13. An embossed carrier tape using the electrically conductive sheet as defined in claim 5.

14. An embossed carrier tape using the electrically conductive sheet as defined in claim 6.

15. An electronic component package using the embossed carrier tape as defined in claim 13.

16. An electronic component package using the embossed carrier tape as defined in claim 14.

17. The electrically conductive resin composition of claim 1, wherein the styrene copolymer comprises a styrene/diene block copolymer resin.

18. The electrically conductive resin composition of claim 1, wherein the styrene copolymer comprises a resin having a styrene/diene block copolymer hydrogenated.

19. The electrically conductive resin composition of claim 1, wherein the styrene copolymer comprises a styrene/butadiene/butyrene/styrene block copolymer resin.

20. The electrically conductive resin composition of claim 2, wherein the styrene copolymer comprises a styrene/diene block copolymer resin.

21. The electrically conductive resin composition of claim 2, wherein the styrene copolymer comprises a resin having a styrene/diene block copolymer hydrogenated.

22. The electrically conductive resin composition of claim 2, wherein the styrene copolymer comprises a styrene/butadiene/butyrene/styrene block copolymer resin.

* * * * *